US007561283B2

(12) United States Patent
Kitahara et al.

(10) Patent No.: US 7,561,283 B2
(45) Date of Patent: Jul. 14, 2009

(54) BARCODE PRINTING SYSTEM, AND METHOD AND PROGRAM OF SETTING A VIRTUAL BARCODE FONT

(75) Inventors: Katsuhito Kitahara, Kagashima (JP); Sunao Murata, Toronto (CA); Yukiharu Horiuchi, Chino (JP)

(73) Assignee: Seiko Epson Corporation, Tokyo (JP)

( * ) Notice: Subject to any disclaimer, the term of this patent is extended or adjusted under 35 U.S.C. 154(b) by 821 days.

(21) Appl. No.: 10/850,905

(22) Filed: May 21, 2004

(65) Prior Publication Data
US 2005/0012949 A1 Jan. 20, 2005

(30) Foreign Application Priority Data
May 22, 2003 (JP) .............................. 2003-145430

(51) Int. Cl.
*H04N 1/46* (2006.01)
*H04N 1/40* (2006.01)
*G06K 19/00* (2006.01)
*G06K 7/10* (2006.01)
*G08C 21/00* (2006.01)

(52) U.S. Cl. ...................... 358/1.11; 358/537; 358/539; 358/470; 358/1.13; 235/487; 235/462.07; 235/462.01

(58) Field of Classification Search ................ 358/1.18, 358/1.15; 345/468, 471, 469; 715/732, 531, 715/751, 248, 235; 235/462.25, 462.15, 235/462.01; 717/107; 705/1
See application file for complete search history.

(56) References Cited

U.S. PATENT DOCUMENTS

| 5,227,643 | A | * | 7/1993 | Craig et al. ............ 235/462.15 |
| 5,239,622 | A | * | 8/1993 | Best et al. ................. 358/1.18 |
| 5,544,287 | A | * | 8/1996 | Roth ......................... 358/1.15 |
| 5,617,528 | A | | 4/1997 | Stechmann et al. |
| 6,147,767 | A | * | 11/2000 | Petteruti et al. ............ 358/1.18 |
| 6,249,908 | B1 | * | 6/2001 | Stamm ....................... 345/468 |
| 6,540,142 | B1 | * | 4/2003 | Alleshouse ............ 235/462.01 |
| 6,580,438 | B1 | * | 6/2003 | Ichimura et al. ............ 715/732 |
| 6,607,130 | B2 | * | 8/2003 | Gyllenskog ............ 235/462.25 |
| 6,633,292 | B2 | | 10/2003 | Nakatsuji et al. |
| 6,802,055 | B2 | * | 10/2004 | Jade et al. .................... 345/619 |
| 6,956,593 | B1 | * | 10/2005 | Gupta et al. ................ 715/751 |
| 6,968,504 | B2 | * | 11/2005 | Broman et al. ............. 715/531 |
| 7,178,102 | B1 | * | 2/2007 | Jones et al. ................ 715/235 |

(Continued)

FOREIGN PATENT DOCUMENTS

EP 0 858 027 A2 8/1998

(Continued)

*Primary Examiner*—King Y Poon
*Assistant Examiner*—Akwasi M Sarpong

(57) ABSTRACT

A printing system for one- or two-dimensional barcodes, and a method and program of creating virtual fonts for such barcodes enable the font and output parameters of the font to be easily changed. The printing system for printing one- or two-dimensional barcodes has a host computer and a printer in communication therewith. The host computer has an application program for creating text data containing a one- or two-dimensional barcode and a printer driver for converting the text data to commands and for sending the commands to the printer. The printing system also has a virtual font configuration program for defining a virtual font linking one- or two-dimensional barcode font data of the printer driver with parameter values configuring the corresponding barcodes.

2 Claims, 6 Drawing Sheets

U.S. PATENT DOCUMENTS

| | | | |
|---|---|---|---|
| 7,299,233 B2 * | 11/2007 | Ikegawa | 358/1.1 |
| 2001/0043214 A1 * | 11/2001 | Nakatsuji et al. | 345/471 |
| 2003/0052171 A1 | 3/2003 | Gyllenskog | |
| 2003/0187681 A1 * | 10/2003 | Spain | 705/1 |
| 2004/0094632 A1 * | 5/2004 | Alleshouse | 235/494 |

FOREIGN PATENT DOCUMENTS

| | | |
|---|---|---|
| JP | 2113963 | 4/1990 |
| JP | 05-225366 | 9/1993 |
| JP | 5324219 | 12/1993 |
| JP | 06-266870 | 9/1994 |
| JP | 10217548 | 8/1998 |
| JP | 11-221946 | 8/1999 |
| JP | 2002-273947 | 9/2002 |

* cited by examiner

BARCODE PRINTING SYSTEM, AND METHOD AND PROGRAM OF SETTING A VIRTUAL BARCODE FONT

BACKGROUND OF THE INVENTION

1. Field of the Invention

The present invention relates to a system for printing one- or two-dimensional barcodes, and a method and program for setting a virtual font for either or both of such barcode symbologies.

2. Description of the Related Art

Conventional one-dimensional barcodes (also referred to as simply "1D barcodes" below) and newer two-dimensional barcodes (referred to as "2D barcodes" below) are commonly used to encode product information printed on a label. Product information for a particular product can then be read by scanning the printed 1D barcode or 2D barcode using a dedicated barcode scanner. Because a large amount of information can be recognized by a computer in a short time by scanning 1D or 2D barcodes with a scanner, barcodes have been applied in many fields other than simply managing product information.

In order to print 1D barcodes using a computer and a printer, the printer driver installed in the computer must instruct the operating system of the computer what barcode fonts are available. These barcode fonts could be stored in ROM in the printer or other storage device accessible to the printer driver. This process enables the barcode fonts to be recognized by the computer as a usable font, and application programs running on the operating system and generating the actual barcode data for printing can therefore use these barcode fonts to generate the barcode data for printing the barcodes. See, for example, Japanese patent document 11-221946A.

FIG. 6 shows an example of a screen in a word processing application program used to generate barcodes. The user enters a character string of information to be converted to a barcode in a data entry area 110 using a keyboard connected to the computer, and generates a data file. A font is selected from a pull-down font menu 120, and the font size is selected from a pull-down font size menu 130. The barcode font known as "JAN13" is selected for the text on the first line in the data entry area 110, and the barcode font known as "JAN8" is selected for the text on the second line. The letter "a" on the third line is known as a control character. This control character "a" indicates that the data strings contained on the following lines (that is, the fourth and following lines in this example) are to be printed without the corresponding HRI (Human Readable Interpretation). This HRI is a text string of the barcode content written in a human readable form.

When the operator then instructs the word processing application program to print the data file, the printer driver receives the data from the operating system (OS), converts the data strings contained in the data file to commands that can be interpreted by the printer according to the printer description language, and outputs the result to the printer. The printer then interprets the received commands, and prints the barcode on the print medium (paper) based on the specified barcode font, font size, and whether the HRI is to be printed.

To print a 2D barcode, a data file for printing a 2D barcode is created using a word processing application program, and a parameter file for setting the 2D barcode parameters is created using a text editor, for example. When the data file created by the word processing application program is then printed, the printer driver receives the data file from the OS. The printer driver then converts the data strings in the data file to commands that can be interpreted by the printer while referencing the predefined parameter file, and outputs to the commands to the printer. The printer then interprets the received commands, and prints the 2D barcode on paper according to the commands.

To change the barcode font, barcode size, or whether the HRI is also to be printed with this configuration requires the user to select a different barcode font from the font menu 120, select a different font size from the font size menu 130, and specify whether to print the HRI. The problem, therefore, is that relatively simple changes require the user to change multiple settings, a task that is repetitive and complicated.

Furthermore, changing the type of 2D barcode and its printing parameters likewise requires setting the font type from the font menu 120, changing the parameter settings in the parameter file and saving the parameter file, or creating a new parameter file. A complicated process is therefore also required to adjust 2D barcode printing.

OBJECTS OF THE INVENTION

The present invention is directed to solving the above-identified problems by providing a system for printing code symbols, such as one-dimensional or two-dimensional barcodes that allows the code font, size, type and/or other parameters to be changed easily.

A further object of this invention is to provide a method and program for setting a virtual barcode font.

SUMMARY OF THE INVENTION

In one aspect, the invention involves a printing system for printing one- or two-dimensional barcodes comprising a computer and a printer in communication therewith. The system further comprises an application program for creating text data to be printed in the form of a one-dimensional or two-dimensional barcode; a printer driver for converting the text data to commands and sending the commands to the printer; and a virtual font configuration program for defining a virtual font that links barcode data corresponding to one of the barcode fonts and parameter values configuring that barcode font.

The application program comprises a selector module configured to enable selection of one of a plurality of one-dimensional or two-dimensional barcode fonts available for printing by the printer or the virtual font defined by the virtual font configuration program. When a virtual font is selected, the printer driver is adapted to convert the text data to commands using the barcode data of the selected virtual font and the parameter values linked to it.

The computer and printer can be separate units or integrated into a single unit. If these components are separate units the application program, printer driver and virtual font configuration program may reside on the computer component of the system.

In another aspect of the invention, a font configuration method for one-dimensional or two-dimensional barcodes is characterized by configuring a virtual font that links barcode data corresponding to a selected one of a plurality of one-dimensional or two-dimensional barcode fonts with parameter values configuring the selected barcode font. Preferably in this font configuration method the parameter values include information relating to at least one of the following: barcode size, printing or not printing of a Human Readable Interpretation (HRI), HRI position, error correction level, or mode.

Such a font configuration method can be embodied as a program on a device-readable medium for instructing a computer to perform the method. The device-readable medium may be any physical structure that is capable of storing a program. Such structures include, but are not limited to, RAM, ROM or other computer memory, compact discs, memory sticks, etc. The device-readable medium may also be a carrier wave on which the program can be carried. A carrier wave suitable for wired or wireless transmission may be used.

According to another aspect of this invention, a font configuration apparatus is provided. The apparatus comprises a selection module configured to select a barcode font from among a plurality of barcode fonts corresponding to printable one-dimensional or two-dimensional barcodes; a parameter setting module configured to set parameters configuring the barcode selected by the selection module; and a virtual font creating module configured to create a virtual font by linking barcode font data corresponding to the selected barcode font with the parameters set by the parameter setting module.

In accordance with still another aspect, the invention involves a printer control apparatus for setting information for printing by a specific printer and for controlling the printer. The printer control apparatus comprises a storage medium configured to store barcode fonts corresponding to one-dimensional or two-dimensional barcodes printable by the specific printer; a display configured to selectably displaying the barcode fonts; a parameter input module configured to receive input of parameters configuring a selected barcode font; a virtual font name input module configured to receive input of a name for a virtual barcode font to be created; a virtual font generation module configured to link the barcode font data corresponding to the selected barcode font with the parameters received by the parameter input module, and creating a virtual font with the name received by the virtual font name input module; and a reporting module configured to report the virtual font created by the virtual font generation module to an operating system under which an application program runs so that the virtual font can be used from the application program.

Each module may be a software application or portion thereof installed on the apparatus.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Preferred embodiments of the present invention are described below with reference to the accompanying figures.

First Embodiment

Figure 1:
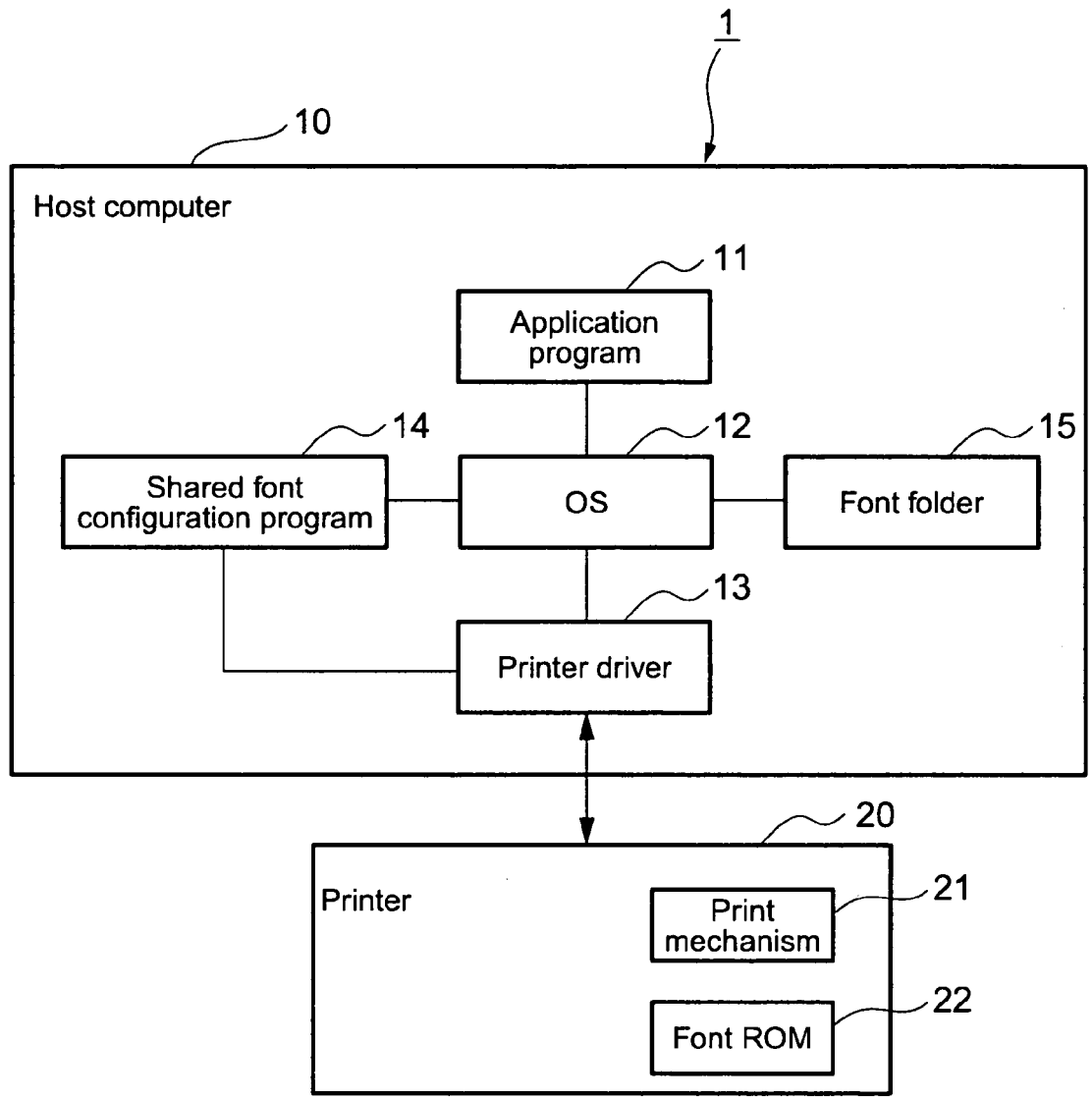
FIG. 1 is a block diagram showing a barcode printing system according to a preferred embodiment of the present invention.

FIG. 1 is a block diagram showing a barcode printing system 1 according to this embodiment of the invention. This barcode printing system 1 has a host computer 10 for creating barcode print data, and a printer 20 for printing barcodes on paper or other medium based on the barcode print data output from host computer 10.

The main software installed on host computer 10 includes an operating system (OS) 12, an application program 11, and a printer driver 13.

Figure 6:
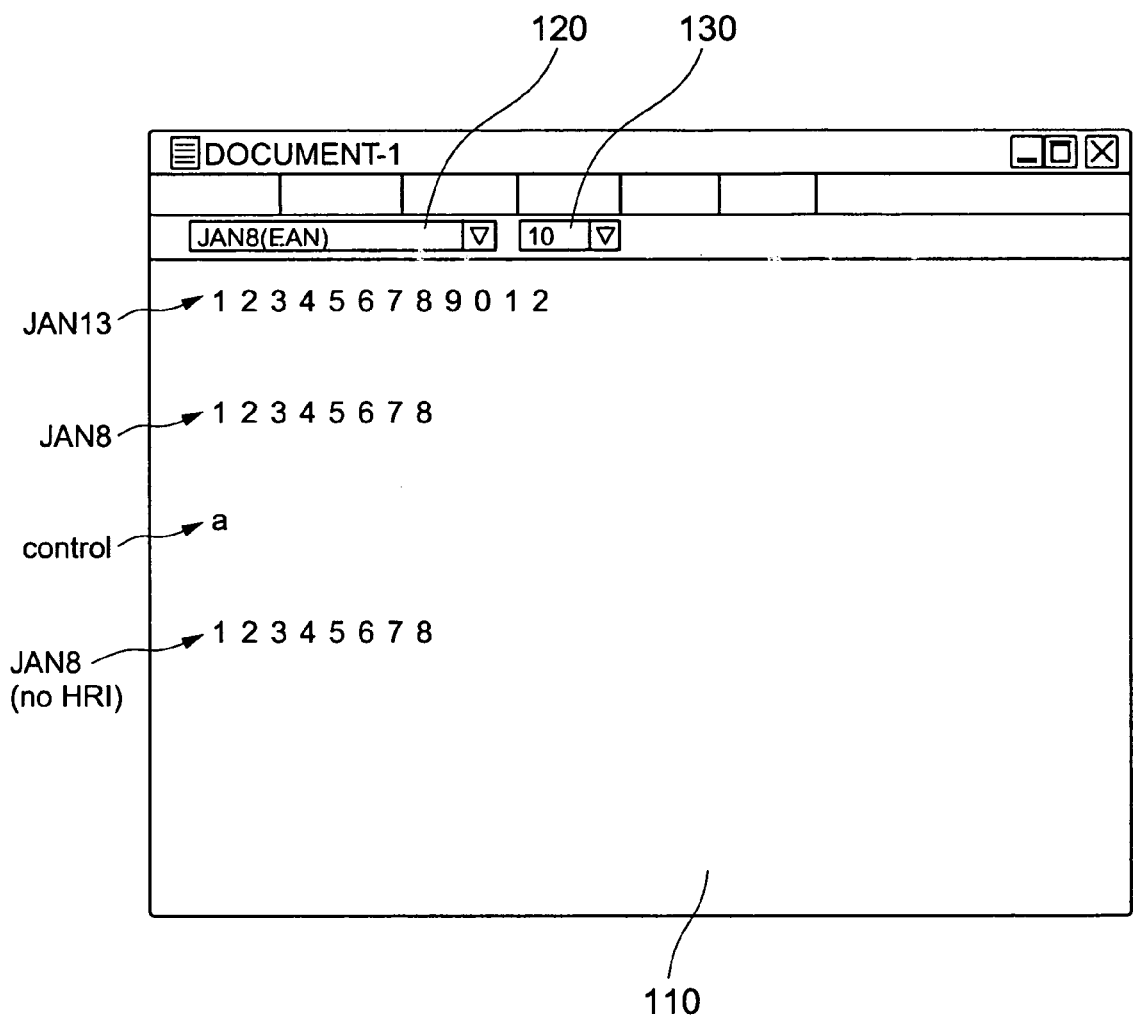
FIG. 6 shows a screen of a word processing application program as an example of a software application for creating 1D or 2D barcodes.

OS 12 is the basic program controlling the hardware components of host computer 10, and thus provides the essential basic operating and processing environment for data input/output control and processing, file management, and application execution that enable host computer 10 to function as a computer system. In this preferred embodiment of the invention OS 12 provides a graphical user interface (GUI) with a window system, such as that shown in FIG. 6, as the user interface.

Application programs 11 include programs for manipulating text, graphics, and display data. The application programs are managed by OS 12 to create data of different kinds. In this embodiment of the invention a particular application program 11 is used to create a text document containing the barcode information used for barcode printing. Application program 11 may be any suitable application program or combination thereof.

Printer driver 13 is a device driver enabling a printer 20 to execute a printing process. Printer driver 13 converts text data created by application program 11 to command data that can be interpreted by printer 20. The command data produced by printer driver 13 is then output to printer 20.

Printer driver 13 has font data relating to the character fonts stored in a font ROM 22 of printer 20. This font data can be acquired from a font ROM 22 of the printer 20 when the printer driver 13 is installed on the host computer 10. The acquired font data is stored in a font folder 15 created for OS 12 to manage the fonts used in host computer 10.

Printer driver 13 also has information relating to the barcodes that are printable by printer 20. Such information is stored as barcode font data and can be handled in the same way as font data for the character fonts.

It is also possible to store the barcode fonts for barcode printing in font ROM 22 in the same way that character fonts are stored, in which case printer driver 13 can be configured to use barcode font data relating to these barcode fonts. In this case the printer driver 13 acquires the barcode font data for the barcode fonts when it acquires the font data for the character fonts stored in the font ROM 22.

The barcode font data is stored in font folder 15. Barcode font types printable by the printer 20 include, for example, JAN8 (EAN), JAN13 (EAN), CODE39, CODE93, CODE128 (EAN), ITF, and CODABAR.

Figure 2:
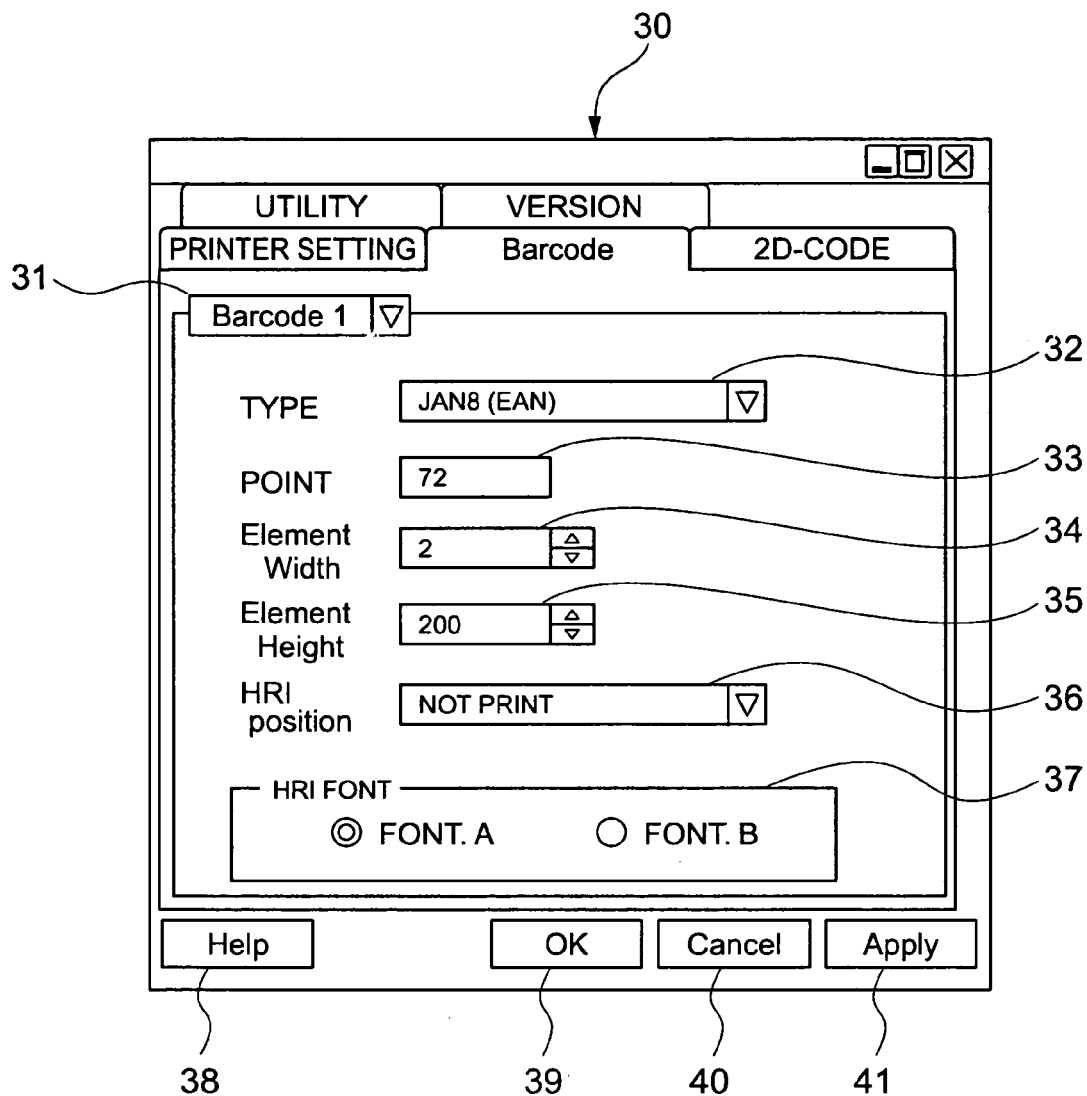
FIG. 2 shows a window of a virtual font configuration program for creating a virtual font for 1D barcode symbols.
Figure 5:
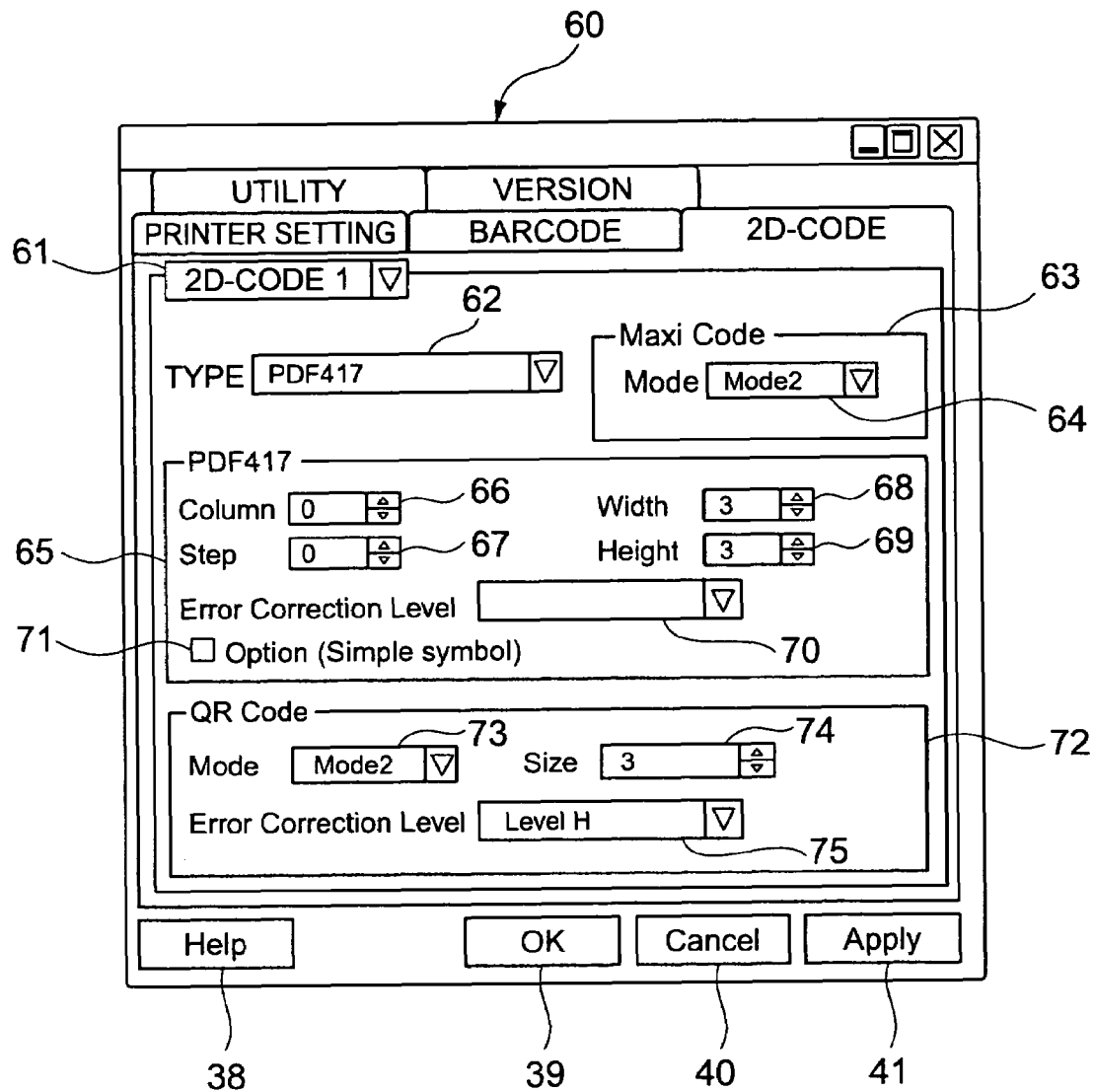
FIG. 5 shows a window of the virtual font configuration program for creating a virtual font for 2D barcode printing.

As shown in FIG. 1, the barcode printing system 1 includes a virtual font configuration program 14, which is a utility program for setting up printer driver 13 and is installed at the time the printer driver is installed. Virtual font configuration program 14 is presented as a tabbed printer properties and a printing configuration window that is opened by OS 12. Examples of such a window are shown in FIGS. 2 and 5. Virtual font configuration program 14 is used to set the virtual fonts that are used by application program 11 to generate barcode data based on the barcode font data of printer driver 13.

These virtual fonts are new font data combining font data referring to existing barcode fonts with various parameter settings. That is, a virtual font is font data linking a font type with specific settings for that font. Using the JAN8 (EAN) barcode font as an example, the size of elements in the barcode, whether the HRI is included, and the position of the HRI if included, could be provided as user-definable parameters, but in the virtual font linked to the JAN8 (EAN) these parameters are preset using virtual font configuration program 14. The virtual fonts are also listed in the font menu of application program 11 and can be selected by application program 11 in the same manner as any other barcode or character font can be selected.

FIG. 2 shows a window 30 that is presented on the display of host computer 10 when virtual font configuration program 14 is started. This window 30 includes multiple text boxes 31 to 36, a selection box 37, and multiple buttons 38 to 41.

Text box 31 is for entering the name of a virtual font. When creating a new virtual font, the user must first enter the desired name of the virtual font in text box 31 using a keyboard or other input device.

Text box 32 is a pull-down menu for selecting the barcode font on which the virtual font will be based. Virtual font configuration program 14 displays the available barcode fonts so that one can be selected from text box 32. These barcode fonts could include, for example, JAN8 (EAN), JAN13 (EAN), CODE39, CODE93, CODE128 (EAN), ITF, and CODABAR. The JAN8 (EAN) font is shown as selected in FIG. 2.

Text box 34 is for selecting the smallest unit width of the printed barcode, and text box 35 is for selecting the height of the printed barcode. The font size calculated from the values selected using text boxes 34 and 35 is displayed in text box 33. It will also be apparent that the font size could be entered in text box 33, and the width and height values displayed in text boxes 34 and 35 could be calculated and displayed based on the selected font size.

Text box 36 is a pull-down menu for selecting whether to print the HRI adjacent to the barcode, and the position of the HRI if printed. In this example the options selectable from text box 36 are DO NOT PRINT, ABOVE, and BELOW.

Selection box 37 is for selecting the text font to be used for HRI printing. Either FONT.A or FONT.B can be selected in this example with FIG. 2 showing FONT.A selected as the HRI text font.

Button 38 is a Help button which when clicked, for example, calls up information about virtual font configuration program 14. Button 39 is an OK button that when similarly clicked creates the virtual font and closes the window 30. Cancel button 40 closes window 30 without creating and saving the virtual font, and Apply button 41 creates the virtual font but does not close the window 30.

When the user enters the desired parameter values in the window 30 and then clicks button 39 or 41, thereby instructing the host computer 10 to create the virtual font, the selected font type and parameter values are linked and a virtual font is created using the virtual font name entered into text box 31 ("Barcode 1" in this example). The content of the virtual font is saved in a parameter file created for access by printer driver 13. Printer driver 13 saves the created virtual font in font folder 15 as new font data. This new virtual font saved in font folder 15 is then available to application program 11.

Multiple virtual fonts can be set with this embodiment of the invention, and different parameter settings can be defined for each of the virtual fonts. For example, the virtual font "Barcode 1" in FIG. 2 uses the barcode font JAN8 (EAN) with the width set to 2 points (or dots), the height set to 200 points (or dots), and no HRI. A different virtual font called "Barcode 2", however, could be set to use the JAN8 (EAN) barcode font, 2 point (or dot) width and 200 point (or dot) height with the HRI printed below the barcode.

Figure 3:
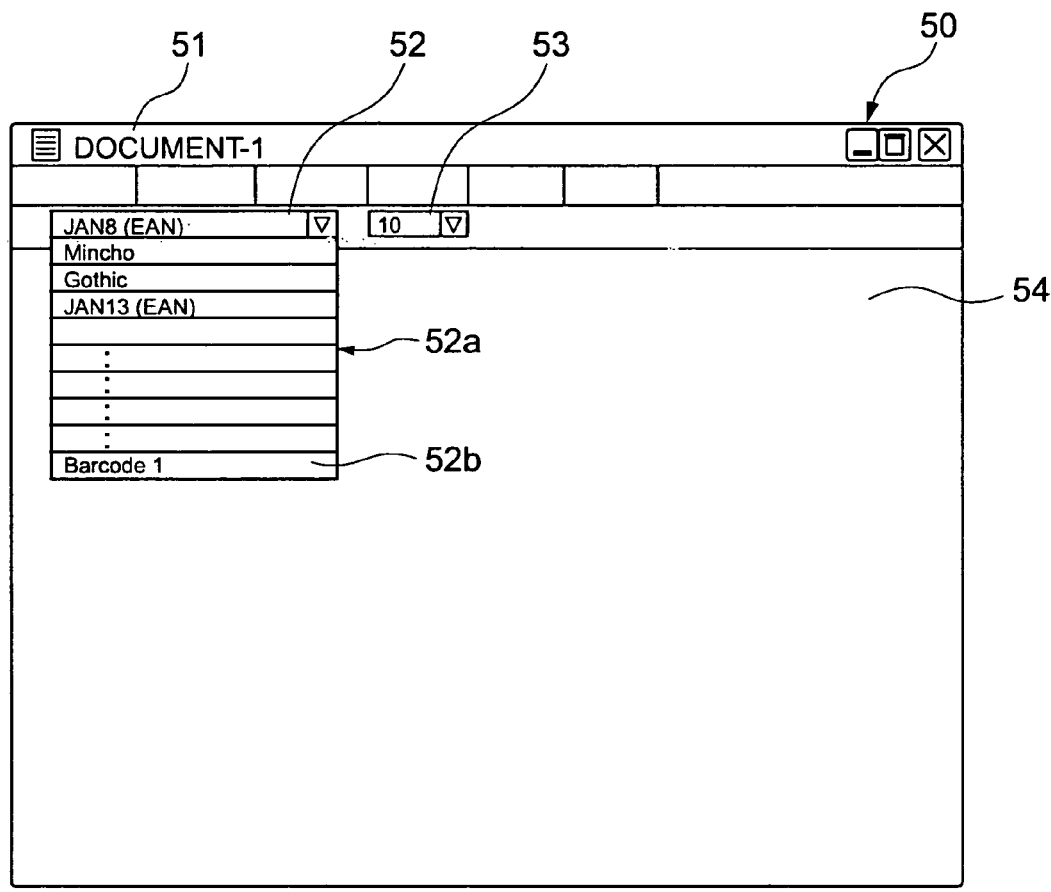
FIG. 3 shows a window of a software application using these virtual fonts.

Creating and printing a barcode using a virtual font thus created is described below. FIG. 3 shows a window 50 of application program 11. The filename 51 of a created text file (document file) is displayed in the title bar at the top row of the window in FIG. 3. With this application program 11 the text string to be barcoded is entered in data entry area 54 using a keyboard or other input device connected to the host computer 10 to create a data file.

As shown in FIG. 3, the font used for printing is selected from a pull-down font menu 52 of application program 11. The selectable font list 52a presented in font menu 52 includes the virtual font "Barcode 1" 52b previously created by virtual font configuration program 14. The user can therefore select this virtual font "Barcode 1" 52b and enter the data to be barcoded in data entry area 54 to create a text file of information for barcode printing.

While the user can change the font size of the entered data using pull-down font size menu 53 when creating a text file of barcode data with the virtual font "Barcode 1" 52b selected, this does not affect the font size that is actually printed because the printed font size is determined by the width and height parameters specified for the barcode elements when the virtual font was defined.

When the user then selects a command to print the created text file, the text file is sent from application program 11 through OS 12 to printer driver 13 which converts the text data to commands that can be interpreted by printer 20. If a virtual font is used for the text data, printer driver 13 reads the specified parameters from the parameter file created when the virtual font was created, and thus confirms the barcode font (barcode type), element size, and whether to print the HRI and the HRI position if printed. Based on these parameters, printer driver 13 then converts the corresponding text data to a print command format, and sends the converted print commands to printer 20. The printer then drives a print mechanism 21 according to the received commands to print and output the hardcopy result.

Figure 4:
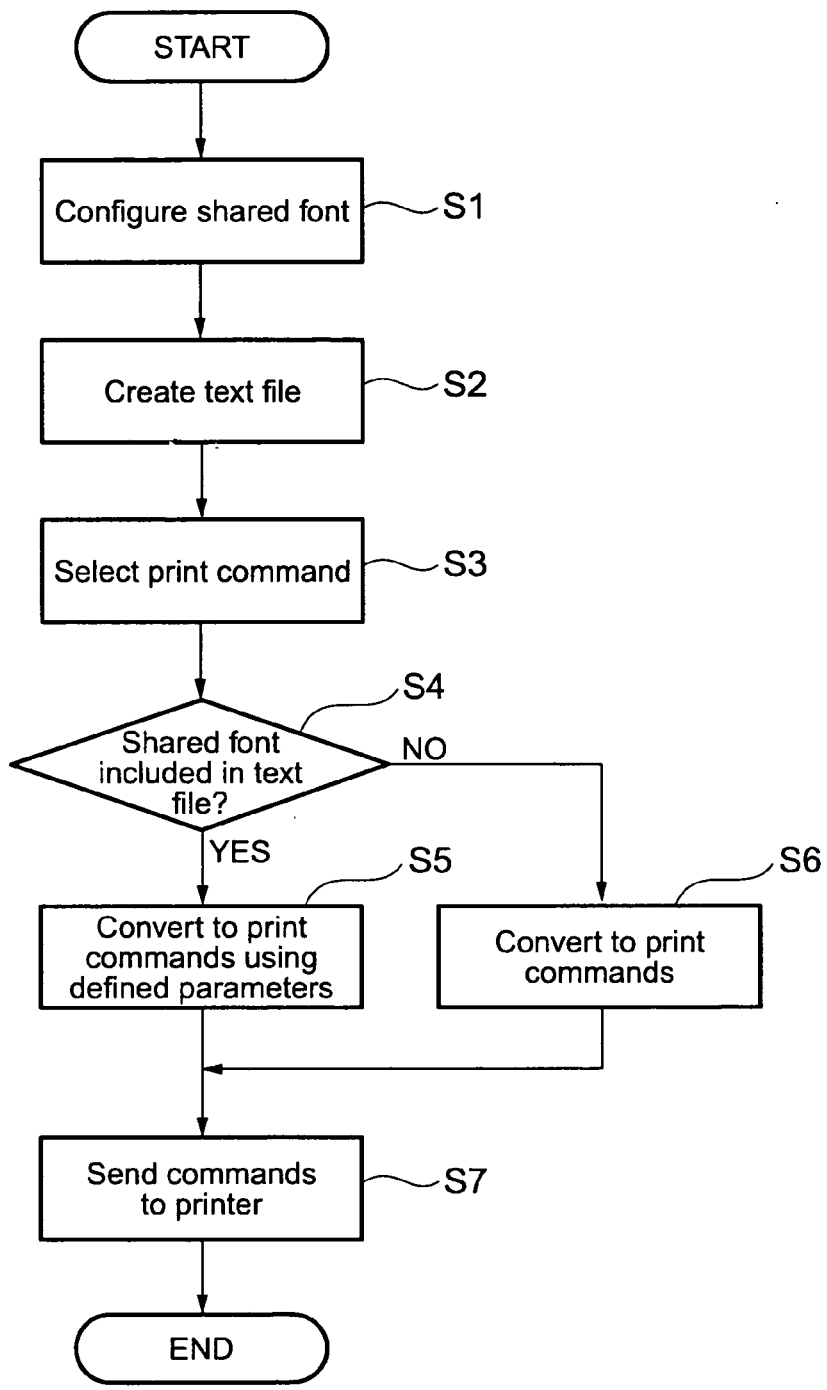
FIG. 4 is a flow chart of a virtual font configuration and a printing process using the defined virtual fonts.

FIG. 4 is a flow chart illustrating the procedure for defining a virtual font and then printing using the defined virtual font. First, in step S1, a virtual font is defined using virtual font configuration program 14 as described above. In other words, configuration window 30 shown in FIG. 2 is presented, and the system then waits for the user to define the virtual font name, select the barcode font that the virtual font is based on, and define the other parameters such as height and width. When the user then confirms the font configuration such as by clicking the OK or Apply button, virtual font configuration program 14 creates a virtual font using the barcode font data and parameter settings defined by the user, and saves the barcode font data and parameter values linked to the defined virtual font name in the font parameter file. Printer driver 13 also registers the virtual font as new font data in font folder 15.

A text file is then created using application program 11 in step S2. The virtual font created in step S1 can be selected as the print font in step S2.

When the user then instructs application program 11 to print the file (step S3), the text data is sent through OS 12 to printer driver 13. The printer driver converts the text data to commands that can be interpreted by printer 20. Printer driver 13 also confirms whether a virtual font is used in the text data (step S4).

If a virtual font is used in the text data, printer driver 13 refers to the font parameter file corresponding to the specified virtual font when converting the text data to print commands (step S5). If a virtual font is not used in the text data, printer driver 13 proceeds with normal print command generation (step S6).

Printer driver 13 then sends the generated print commands to printer 20 (step S7), and the printer runs a printing process based on the received commands.

This embodiment of the present invention thus enables a user to configure a virtual font with predefined parameters using virtual font configuration program 14. When creating a text document containing information to be barcoded, these virtual font parameters can then be applied to the barcoded information by simply selecting and applying a virtual font to the data. Productivity and efficiency are thus improved because it is not necessary to separately select the barcode font, font size, and HRI printing and print position, for example.

Furthermore, by predefining a plurality of virtual fonts with different parameters, the barcode font, size, or HRI settings, for example, of different text can be changed within a single document by simply selecting and applying the appropriate virtual font. Different data can therefore be easily changed to print with different barcode fonts and parameters.

Second Embodiment

FIG. 5 shows a window 60 of virtual font configuration program 14 for defining a virtual font for a 2D barcode. This window 60 has text boxes 61 and 62, MaxiCode font selection box 63, PDF417 font selection box 65, QR Code font selection box 72, and buttons 38 to 41.

The name of the virtual font is entered into text box 61. When creating a new virtual font, the user enters the desired name of the virtual font in text box 61 using a keyboard or other input device.

Text box 62 is a pull-down menu for selecting the 2D barcode font on which the virtual font will be based. Virtual font configuration program 14 displays the 2D barcode fonts available to printer driver 13 so that one can be selected from this text box 62. If printer 20 is compatible with the 2D barcode fonts known as MaxiCode, PDF417, and QR Code, for example, printer driver 13 registers 2D barcode font data for these 2D barcode fonts. The 2D barcode font known as PDF417 is shown as selected in FIG. 5.

MaxiCode font selection box 63 contains the parameters that can be selected when MaxiCode is selected in text box 62. MaxiCode is a 2D barcode with a finder pattern of concentric circles in the center, and has several possible modes. MaxiCode font selection box 63 enables the user to select which of these modes to use from text box 64.

PDF417 font selection box 65 contains the parameters that can be selected when PDF417 is selected in text box 62. PDF417 enables setting the Column, Step, Width, and Height parameters, which the user can define using Column text box 66, Step text box 67, Width text box 68, and Height text box 69. PDF417 also enables setting the error correction level in nine steps from 0 to 8. Which error correction level is used to print the 2D barcode can be defined using text box 70. A box 71 for selecting whether to include an optional Simple Symbol is also included in PDF417 font selection box 65.

The QR Code font selection box 72 contains the parameters for the QR Code when this code is selected in text box 62. QR Code is a 2D barcode of which the smallest code units are black and white squares. QR code has multiple coding modes. Which of these modes is used when QR Code is selected can be chosen from text box 73 in QR Code font selection box 72. The QR Code size can also be selected from text box 74 in QR Code font selection box 72. QR Code also allows for four error correction levels (L, M, Q, H), and which error correction level is used for printing QR Code symbols can be selected from text box 75.

The functions of buttons 38 to 41 are the same as described in the first embodiment. When the user configures the 2D barcode font parameters in window 60 and clicks button 39 or 41, thereby telling host computer 10 to create and save the virtual font, a virtual font having the virtual font name entered in text box 61 ("2D-CODE1" in this example) is created. This font configuration is then saved in the font parameter file of printer driver 13. The printer driver then registers the created virtual font as new font data in font folder 15. The virtual fonts registered in font folder 15 are also available to application program 11. This completes creating a virtual font.

In the same way as for 1D barcode fonts described in the first embodiment, this second embodiment enables the user to define a common 2D barcode font with preset parameters by using virtual font configuration program 14. When text data to be printed as a 2D barcode is then created, the symbol parameters can be set by simply selecting the desired virtual font. It is therefore not necessary for the user to select the font and configure the available parameters when running application program 11.

Multiple virtual fonts can be defined in this way. If multiple fonts are thus defined and the user wants to change the applied 2D barcode font or parameters, the desired font can be simply selected from a menu to apply the different 2D barcode symbol and parameters. When different 2D barcode symbols and settings are often used, productivity and efficiency can therefore be improved by predefining multiple appropriately configured virtual fonts.

As the foregoing demonstrates, virtual fonts with preconfigured parameters can be easily defined using the virtual font configuration program of the present invention. Furthermore, these virtual fonts can be simply selected to apply the defined parameters to selected text when creating text data to be printed as one-dimensional or two-dimensional barcodes. Text data containing data to be printed as one-dimensional or two-dimensional barcodes can therefore be easily created and printed easily and quickly.

In the explanation above it was assumed that certain barcode fonts are stored in a font memory either in the printer or in the host computer including external storage connected to any of them. In such case printing is performed by designating a certain element of a selected barcode font, retrieving from the barcode font memory a bitmap that represents the designated element and printing that bitmap. Instead of retrieving stored bitmap data it is possible to create the bitmap data each time it is needed. This may be achieved either in the host computer or in the printer on the basis of barcode printing commands that designate the type of barcode, the height and the width and prestored information that allows creating the bitmap with these parameters. For the present invention it is not critical whether barcode fonts are stored or created in this way; the invention is thus deemed to cover use of a barcode font memory as well as any other way of barcode printing in which barcodes to be printed are designated by the parameters explained above.

The present invention has been described in connection with preferred embodiments thereof with reference to the accompanying drawings. However, as will be apparent to those skilled in the art from the foregoing description, various changes and modifications are possible. For example, both one-dimensional and two-dimensional barcodes could be handled and printed by a single printing system. The invention can also be applied to codes and symbols other than one-dimensional and two-dimensional barcodes. These and other changes or modifications that fall within the scope of the appended claims are part of the invention.

What is claimed is:

1. A printing system for printing one- or two-dimensional barcodes, comprising a computer and a printer in communication with the computer, the printing system further comprising:
   an application program for creating text data to be printed in the form of a one-dimensional or two-dimensional barcode;
   a printer driver for converting the text data to commands and sending the commands to the printer, the printer driver acquiring barcode font data from the printer resulting in the printer driver having barcode fonts relating to barcodes that are printable by the printer; and
   a virtual font configuration program for defining a virtual font that links barcode data corresponding to one of existing barcode fonts in the printer driver and parameter values configuring that barcode font, the parameter values including at least one of printed barcode width, printed barcode height, or barcode font size;
   wherein the application program comprises a selector module configured to enable selection of one of a plurality of existing one-dimensional or two-dimensional barcode fonts available for printing by the printer or the virtual font defined by the virtual font configuration program;
   wherein, when a virtual font is selected, the printer driver is adapted to convert the text data to commands using the barcode data of the selected virtual font and the parameter values linked to it.

2. The printing system of claim 1, wherein the parameter values further include information relating to at least one of printing or not printing of a Human Readable Interpretation (HRI), HRI position, error correction level, or mode.

* * * * *